UNITED STATES PATENT OFFICE.

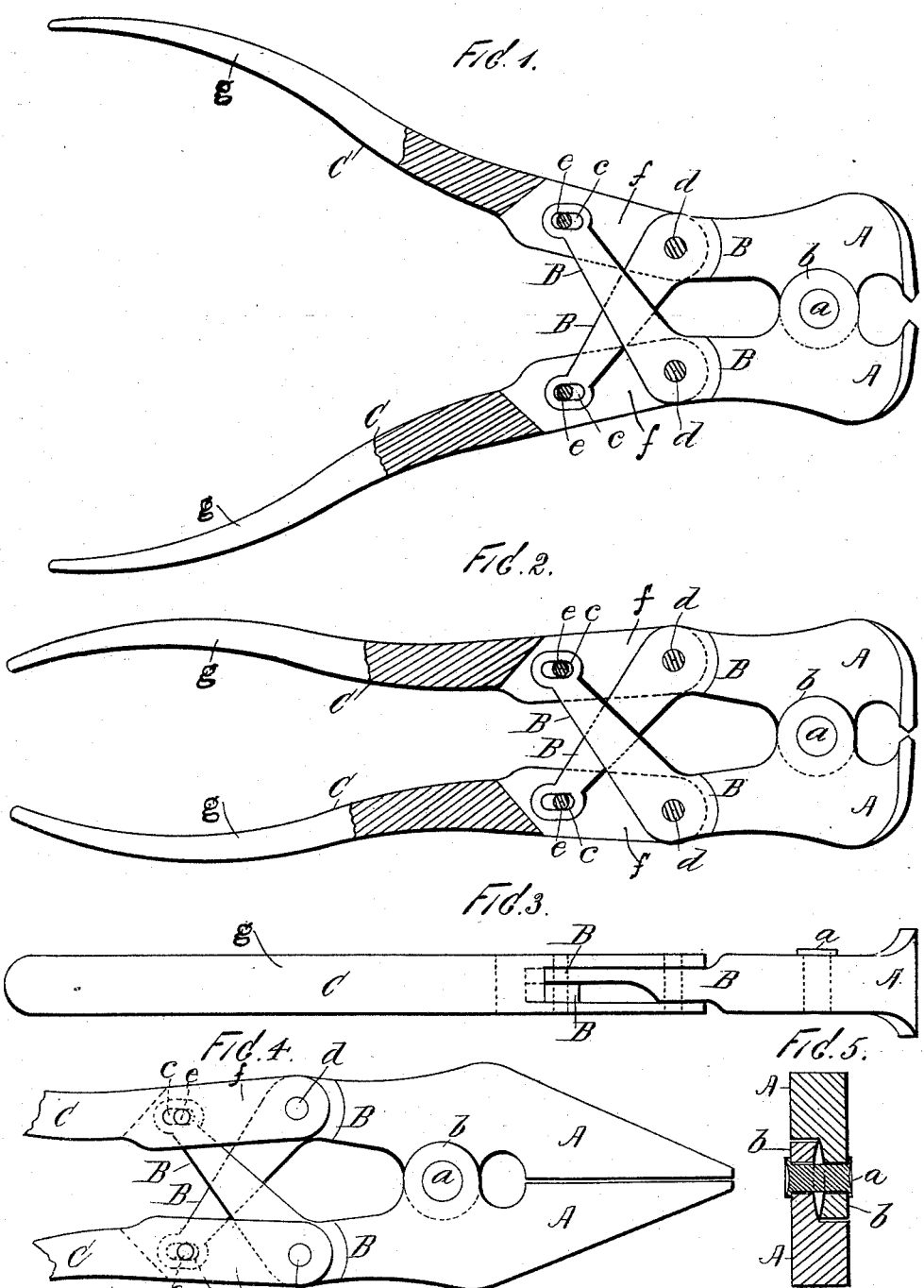

JAMES LINDSAY, OF WATERBURY, CONNECTICUT.

CUTTING AND GRIPPING TOOL.

SPECIFICATION forming part of Letters Patent No. 509,920, dated December 5, 1893.

Application filed July 25, 1893. Serial No. 481,415. (No model.)

*To all whom it may concern:*

Be it known that I, JAMES LINDSAY, of Waterbury, in the county of New Haven and State of Connecticut, have invented certain new and useful Improvements in Cutting and Gripping Tools; and I do hereby declare that the following is a full, clear, and exact description of the same, reference being had to the accompanying drawings, making a part of this specification, in which—

Figure 1 is a longitudinal elevational view partly in section of a cutting implement made according to my invention, showing the relation of the parts and their position when the implement is opened preliminary to a cutting operation. Fig. 2 is a corresponding view of the implement when closed. Fig. 3, is an edge view of the same. Fig. 4 is a side view illustrating the said invention as embraced in a gripping tool, and Fig. 5 is a transverse sectional view showing a further feature or combination of parts also embraced in my said invention.

This invention comprises, first, a novel combination of parts whereby I am enabled to secure a very great leverage with a corresponding increase of power, upon the jaws of the implement, and second, in a novel combination of parts whereby the pivoted connection of the jaws the one with the other is secured in a simple and economical manner without detracting from the stability of such connection of the said parts.

A, A, are two jaws the form and character of which vary according to the work for which the implement is to be used as, for example, cutting jaws as shown in Figs. 1 and 2, or gripping jaws as shown in Fig. 4. These jaws are pivoted together by a transverse pivot, $a$, passed through suitably located overlapping lugs, $b$, formed upon said jaws. Each of these lugs is centrally hollowed out at its inner surface as shown in Fig. 5, so that the two lugs bear upon each other at their peripheries. By tightening the pivot, $a$, this circumferential bearing of the lugs against each other causes them to fit snugly and firmly without tendency to wabble, and this effect being thus secured, a single lug upon each jaw suffices for their pivotal connection with each other, and inasmuch, as the jaws may be made with one lug each much more cheaply than where a lug in one jaw is placed between two lugs on the other, it follows that a corresponding economy in the manufacture of the implement is secured. As concerns the first or principal feature of my invention, however, the jaws may be pivotally connected with each other in any suitable manner. Extended back from each jaw, A, is a shank, B. The two shanks, B, B, are arranged to cross each other as fully illustrated in Figs. 1 and 2, and in the end of each is a slot, $c$, which, in a general way, may be said to extend in the direction of the length of the implement.

C, C, are the handles of the implement. Each of these handles comprises a lever which is pivoted by a pin or pivot, $d$, to the adjacent jaw, A, at or near the angle of said jaw with its shank B. Each of said handles is, at its inner end, longitudinally slotted as at, $f$, to receive the extremity of the shank of the opposing jaw, A, as more clearly shown in Figs. 1, 2 and 3. Pins, $e$, $e$, passing through the thus slotted portions of the handles pass also through the slots $c$, $c$, in the extremities of the shanks, so that as concerns each jaw the shank thereof is connected by a pin, $e$, with the handle which is pivoted to the opposite jaw. In other words each handle, C, is pivotally connected at its inner extremity with one jaw, A, by a pivot, $d$, and at a point more remote from its said extremity is pivotally connected by a pin, $e$, with the extremity of the shank of the other jaw, said shanks being crossed as hereinbefore explained.

In the working of the implement, the jaws, A, A, are spread or opened by bringing apart the outer ends, $g$, of the handles, which causes the pivots, $d$, $d$, to approach each other at the same time that the pins, $e$, $e$, with the slotted ends of the shanks are spread farther apart, this resulting in the opening or separation of the jaws to permit the insertion between them of the wire or other article to be cut or gripped as the case may be. By bringing the outer ends of the handles toward each other, the movement of the jaws is, of course, reversed and they are caused to sever, or tightly hold, according to the purpose for which said jaws are constructed and designed, the article placed between them. It will be observed that in the closing of the jaws as described, the pivots, $d$, $d$, and the forward ends of the handles spread farther apart and that simultaneously with this the pins, $e$, $e$, move toward each other and of course move with them the extremities to which they are attached to the shanks, B, B, so that the movements of the handles provide an actual leverage as of the short arms of levers, exerted upon the jaws to close the same, with the outer or longer portions of the handles operating as the long arms of levers in thus operating the said jaws. By this means the leverage capable of being exerted upon the jaws is very great.

It is to be noted that the object of providing the elongated openings or slots, $c$, in the ends of the shanks for the pins, $e$ $e$, to play through, is to permit the requisite freedom of movement of said shanks, inasmuch, as the shanks would bind or become practically inoperative if the connection of said pins with the ends of the shanks were made too snug.

What I claim as my invention is—

1. The combination of the jaws A, A, constructed with the crossed shanks, B, B, each having a slot, $c$, in its end, the pivot, $a$, connecting said jaws with each other and the handles, C, C, each pivoted to the shank of one of the jaws at a point adjacent to said jaw and to the slotted end of the shank of the opposite jaw, substantially as and for the purpose herein set forth.

2. In a cutting or gripping implement, the combination with the jaws, A, A, each having a single overlapping lug, $b$, centrally hollowed in its inner surface to secure a circumferential bearing of the said lugs upon each other, of a pivot passed through said lugs to pivotally connect the jaws the one with the other and hold the inner peripherical surface of the lugs in contact, substantially as and for the purpose herein set forth.

JAMES LINDSAY.

Witnesses:
JNO. C. McQUHAE,
GRAHAM McADAM.